United States Patent
Ide et al.

[11] Patent Number: 5,949,220
[45] Date of Patent: Sep. 7, 1999

[54] BATTERY CHARGER

[75] Inventors: Yuzo Ide; Koichi Inoue, both of Kyoto, Japan

[73] Assignee: Rohm Co., Ltd., Kyoto, Japan

[21] Appl. No.: 09/068,989

[22] PCT Filed: Sep. 24, 1997

[86] PCT No.: PCT/JP97/03420

§ 371 Date: May 26, 1998

§ 102(e) Date: May 26, 1998

[87] PCT Pub. No.: WO98/13924

PCT Pub. Date: Feb. 4, 1998

[30] Foreign Application Priority Data

Sep. 27, 1996 [JP] Japan .................................. 8-256776

[51] Int. Cl.$^6$ .................................................. H02J 7/00
[52] U.S. Cl. ........................................... 320/165; 329/139
[58] Field of Search ........................... 320/139, 165; 361/88, 90

[56] References Cited

U.S. PATENT DOCUMENTS

| | | | |
|---|---|---|---|
| 4,680,528 | 7/1987 | Mikami et al. | 320/165 |
| 5,481,174 | 1/1996 | Martin et al. . | |
| 5,633,572 | 5/1997 | Steele et al. | 361/728 |
| 5,818,200 | 10/1998 | Cummings et al. | 320/116 |
| 5,856,737 | 1/1999 | Miller et al. | 320/152 |
| 5,867,006 | 2/1999 | Dias et al. | 320/106 |

FOREIGN PATENT DOCUMENTS

| | | |
|---|---|---|
| 51-90433 | 8/1976 | Japan . |
| 3-11337 | 2/1991 | Japan . |
| 6-269132 | 9/1994 | Japan . |

OTHER PUBLICATIONS

PCT WO91/00623, Jan. 10, 1991, Motorola Inc.

*Primary Examiner*—Peter S. Wong
*Assistant Examiner*—Gregory J. Toatley
*Attorney, Agent, or Firm*—Nikaido, Marmelstein, Murray & Oram LLP

[57] ABSTRACT

A battery charger outputs a high voltage even when a power supply device having a rechargeable battery is not connected to the battery charger so that the battery charger can supply the high voltage to the power supply device whenever the power supply device is connected to the output terminal of the battery charger. This battery charger has periodic signal producing means for supplying a periodically varying periodic signal to the output terminal by charging and discharging a capacitor connected to the output terminal, and detecting means for checking whether the power supply device is connected to the battery charger or not by checking through a filter whether the periodic signal is present at the output terminal or not. Thus, although the battery charger has no mechanical switch, it can detect the presence of the power supply device.

6 Claims, 4 Drawing Sheets

BATTERY CHARGER

This application is an International Stage 371 of PCT/JP97/03420 filed Sep. 24, 1997.

TECHNICAL FIELD

The present invention relates to a charger for a rechargeable battery.

BACKGROUND ART

In general, a battery charger is so designed that it charges a battery by supplying it with an electric current while the voltage across the battery is lower than a predetermined level, and that it thereafter stops charging when the voltage across the battery reaches that predetermined level as the result of the charging. FIG. 7 is a block diagram illustrating how a conventional battery charger is connected to a power supply device (hereafter referred to as the "battery pack"). In FIG. 7, numeral 60 represents the charger, and numeral 61 represents the battery pack that is charged thereby. When the voltage across the battery pack 61 is lower than a predetermined level, the charger 60 charges the battery pack 61 by supplying it with a current Ia, and meanwhile it keeps an LED (light-emitting diode) 64 on to indicate that charging is in progress (this LED will hereafter be referred to as the "charge-in-progress LED"). When the voltage across the battery pack 61 reaches the above-mentioned predetermined level, the charger 60 stops the supply of the current Ia and turns off the charge-in-progress LED 64, and in addition it turns on an LED 65 to indicate that charging has been completed (this LED will hereafter be referred to as the "charge-complete LED").

For example, in a case where the battery pack 61 is a power supply device that employs lithium-ion cells, the battery pack 61 incorporates a protection circuit that serves to secure stable operation of those cells by protecting them against overdischarge and other hazards. As a result, when overdischarge or the like is detected, this protection circuit inhibits the discharging of the battery pack 61 from within it. In this state, where both charging and discharging are inhibited, the charging of the battery pack 61 cannot be restarted without first canceling this inhibiting state. For this reason, the charger 60 is so designed that, even when it is not connected to the battery pack 61, it outputs a voltage almost as high as the voltage across the battery pack 61 in its fully charged state, and on the other hand the battery pack 61 is so designed that it cancels the above-mentioned inhibiting state by detecting a feeble current that flows into it when it is connected to the charger 60 and receives therefrom the above-mentioned high voltage.

At this time, however, precisely because the charger 60 is designed to output a high voltage on its current-supplying side, the charger 60, even when it is not connected to the battery pack 61, keeps the charge-complete LED 65 on, falsely indicating that charging has been completed. To overcome this inconvenience, the conventional charger 60 is, as shown in FIG. 7, fitted with a mechanical switch 63 for checking whether the battery pack 61 is present or not, so that, when it is not connected to the battery pack 61, it can keep both the charge-in-progress LED 64 and the charge-complete LED 65 off. Here, the mechanical switch 63 is a switch that has a contact that is mechanically opened and closed depending on whether the battery pack 61 is present or not.

Having such a mechanical switch 63, the conventional charger 60 is prone to malfunction due to imperfect mechanical contact in the mechanical switch 63, and thus it does not offer satisfactory safety. In addition, the use of the mechanical switch 63 increases the cost of the charger 60.

DISCLOSURE OF THE INVENTION

According to the present invention, a battery charger that outputs a high voltage even when a power supply device having a rechargeable battery is not connected to the battery charger so that the battery charger can supply the high voltage to the power supply device whenever the power supply device is connected to an output terminal of the battery charger is provided with periodic signal producing means for supplying a periodically varying periodic signal to the output terminal, and detecting means for checking whether the power supply device is connected to the battery charger or not by checking whether the periodic signal is present at the output terminal or not.

BEST MODE FOR CARRYING OUT THE INVENTION

Figure 1:
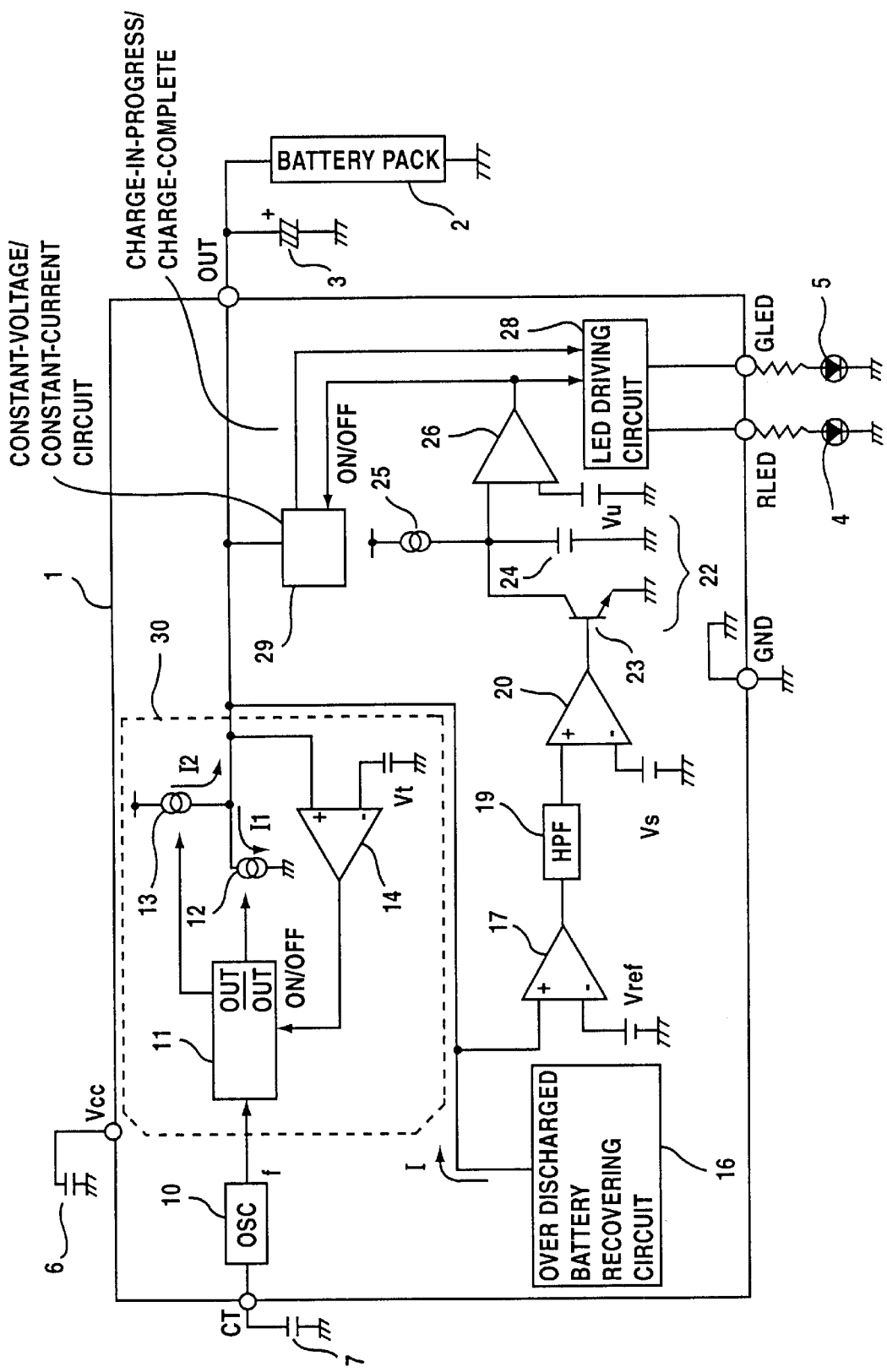
FIG. 1 is a block diagram of a battery charger embodying the present invention.

Hereinafter, an embodiment of the present invention will be described with reference to the drawings. FIG. 1 is a block diagram of the principal portion of a battery charger embodying the invention. This battery charger is formed as an IC (integrated circuit) 1. The IC 1 has a terminal (OUT) to which a battery pack 2 is connected when it is charged. The battery pack 2 is connected in parallel with an output capacitor 3, which is provided outside the IC 1.

The IC 1 also has a terminal (RLED) to which a charge-in-progress LED 4 is connected, and a terminal (GLED) to which a charge-complete LED 5 is connected. As will be described later, when the battery pack 2 is not connected to the terminal (OUT), the LEDs 4 and 5 are both kept off. On the other hand, when the battery pack 2 is connected, only the charge-in-progress LED 4 is kept on when charging is in progress, and only the charge-complete LED 5 is kept on after the voltage of the battery pack 2 reaches a predetermined level.

The IC 1 further has a terminal (Vcc) that is connected to a power source voltage 6 on which the IC 1 operates, a terminal (GND) that is connected to a ground level voltage, and a terminal (CT) that is connected to a capacitor 7. The capacitance of this capacitor 7 determines the oscillation frequency f of the oscillator (OSC) 10 incorporated in the IC 1. An oscillation signal having the frequency f is fed to a control circuit 11 included in a pulse current producing circuit 30.

The control circuit 11 turns on and off current source circuits 12 and 13 by feeding them with a signal that is synchronous with the oscillation frequency f When the current source circuit 12 is off, the current source circuit 13 is on, allowing a current I1 to flow; when the current source circuit 12 is on, the current source circuit 13 is off, allowing a current I2 to flow.

Figure 4:
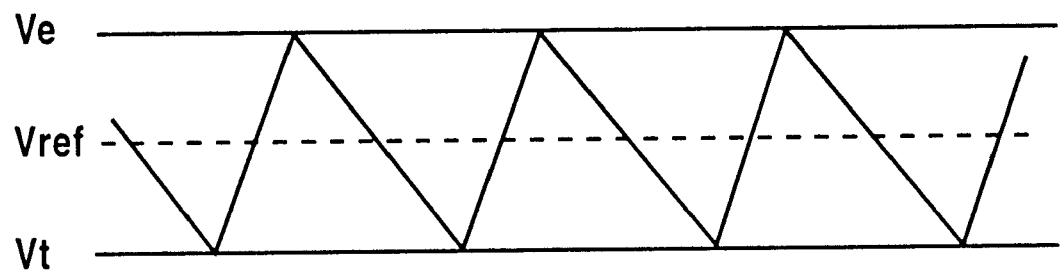
FIG. 4 is a diagram showing the waveform of the voltage appearing at the output terminal of the battery charger of the invention when no battery pack is connected thereto.

As a result, when the battery pack 2 is not connected to the output terminal (OUT), the output capacitor 3, which is connected to the output terminal (OUT), is charged or discharged, and this causes the voltage at the output terminal (OUT) to vary periodically, as shown in FIG. 4, between a full-charge voltage (Ve) and a predetermined voltage (Vt) lower than that. Here, the voltage (Vt) is set, for example, to 99% of the full-charge voltage (Ve), although the proportion is not restricted to any specific value. Depending on the characteristics of the actual circuit and other factors, the waveform may not always be triangular as shown in FIG. 4, but may be square or sawtooth-shaped, for example. The threshold level (Vref) will be described later.

By contrast, when the battery pack 2 is connected to the output terminal (OUT), since the battery pack 2 has a low impedance, the voltage at the output terminal (OUT) is not affected by the current I1 or I2, and thus it is kept equal to the voltage of the battery pack 2. A pulse-drive starting comparator 14 checks whether the voltage of the battery pack 2 is equal to or higher than the voltage (Vt). If the voltage of the battery pack 2 is lower than the voltage (Vt), the control circuit 11 is turned off so that the pulse current producing circuit 30 will be deactivated. On the other hand, when the voltage of the battery pack 2 is equal to or higher than the voltage (Vt), the control circuit 11 is turned on so that the pulse current producing circuit 30 will be activated.

Figure 2:
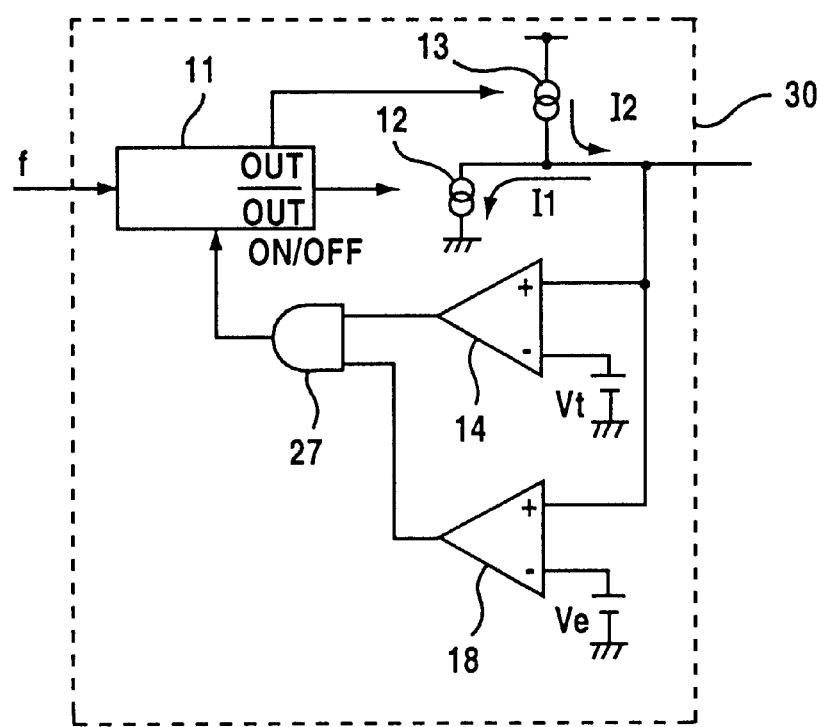
FIG. 2 is a detailed circuit diagram of the pulse current producing circuit used in the battery charger of the invention.

This causes the battery pack 2 to be charged by the pulse current producing circuit 30 and thus causes its voltage to increase gradually. However, since the pulse current producing circuit 30 is, as shown in FIG. 2, so designed that it operates only when the voltage at the output terminal (OUT) is in the range from the voltage (Vt) to the full-charge voltage (Ve), it does not occur that the battery pack 2 is charged beyond its full-charge voltage (Ve). Specifically, the comparator 14 compares the voltage at the output terminal (OUT) with the voltage (Vt), another comparator 18 compares the voltage at the output terminal (OUT) with the full-charge voltage (Ve), and the outputs of these comparators 14 and 18 are fed through an AND gate 27 to the control circuit 11 for its turning-on/off operation. Thus, the pulse current producing circuit 30 operates only when the voltage at the output terminal (OUT) is in the range from the voltage (Vt) to the full-charge voltage (Ve). Note that, in FIG. 2, such elements as are found also in FIG. 1 are identified with the same reference numerals and symbols.

In FIG. 1, when the battery pack 2 is not connected to the terminal (OUT), an overdischarged battery recovering circuit 16 keeps the voltage at the terminal (OUT) equal to the voltage (Vt). This allows the battery pack 2, even when it is in the state in which charging is inhibited due to overdischarge, to receive a high voltage from the overdischarged battery recovering circuit 16 and thereby cancel the inhibiting state as soon as it is connected to the terminal (OUT). A pulse detection comparator 17 compares the voltage at the output terminal (OUT) with a threshold level (Vref), which is set, as shown in FIG. 4, to a voltage between the full-charge voltage (Ve) and the voltage (Vt).

When the battery pack 2 is not connected to the terminal (OUT), the pulse detection comparator 17 outputs a signal that oscillates with a period f in synchronism with a signal fed from the pulse current producing circuit 30. On the other hand, when the battery pack 2 is connected, the pulse detection comparator 17 outputs a fixed high or low level depending on the voltage of the battery pack 2. The signal outputted from the comparator 17 is passed through a high-pass filter 19 to extract only the alternating-current components thereof.

Figure 3:
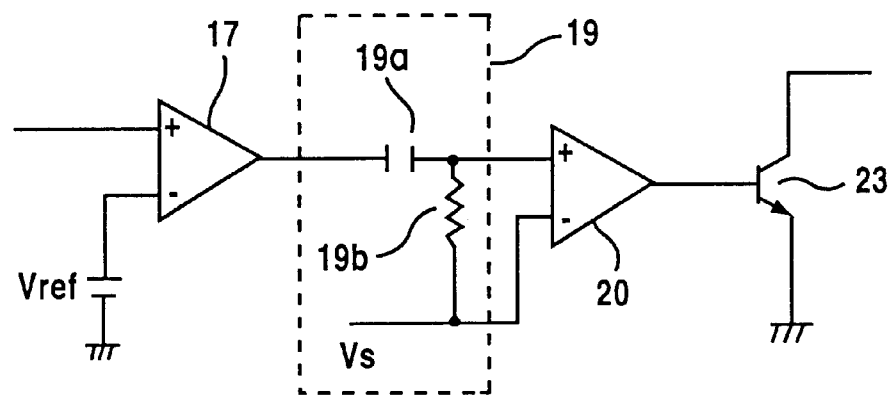
FIG. 3 is a circuit diagram of the high-pass filter used in the battery charger of the invention.

The signal flowing out of the high-pass filter 19 is compared with a reference voltage (Vs) by a comparator 20. The high-pass filter 19 is composed of, as shown in FIG. 3, a capacitor 19a and a resistor 19b, for example. Note that, in FIG. 3, such elements as are found also in FIG. 1 are identified with the same reference numerals and symbols.

Reverting to FIG. 1, when the battery pack 2 is connected to the terminal (OUT), the pulse detection comparator 17 outputs either a fixed high level or a fixed low level, and thus causes the comparator 20 to output a low level. On the other hand, when the battery pack 2 is not connected to the terminal (OUT), the comparator 20 outputs a signal that oscillates regularly with a period f. The output of the comparator 20 is fed to a delay circuit 22. The delay circuit 22 is composed of a switching transistor 23, a capacitor 24, and a current source circuit 25. The voltage across the capacitor 24 is compared with a reference voltage (Vu) by a power-supply-device detecting comparator 26.

When the battery pack 2 is not connected to the terminal (OUT), the signal flowing out of the high-pass filter 19 oscillates, and this causes the transistor 23 to be alternately turned on and off, and thus causes the capacitor 24 to be alternately charged and discharged. As a result, the voltage across the capacitor 24 becomes sufficiently low, and the power-supply-device detecting comparator 26 outputs a low level.

On the other hand, when the battery pack 2 is connected to the terminal (OUT), the transistor 23 is kept off, and therefore the capacitor 24 is charged by the current source circuit 25. When the voltage across the capacitor 24 exceeds the reference voltage (Vu), the power-supply-device detecting comparator 26 outputs a high level.

In this way, by the use of the signal outputted from the power-supply-device detecting comparator 26, it is possible to check whether the battery pack 2 is connected or not. The comparator 26 may also be so configured that, using completely inverted logic, it outputs a high level when the battery pack 2 is not connected and a low level when battery pack 2 is connected.

When the comparator 26 feeds a high level to an LED driving circuit 28, the LED driving circuit 28 turns on either the charge-in-progress LED 4 or the charge-complete LED 5, and thereby indicates that the battery pack 2 is connected to the terminal (OUT). By contrast, when the comparator 26 outputs a low level, the LED driving circuit 28 keeps both LEDs 4 and 5 off, and thereby indicates that the battery pack 2 is not connected to the terminal (OUT).

Figure 5:
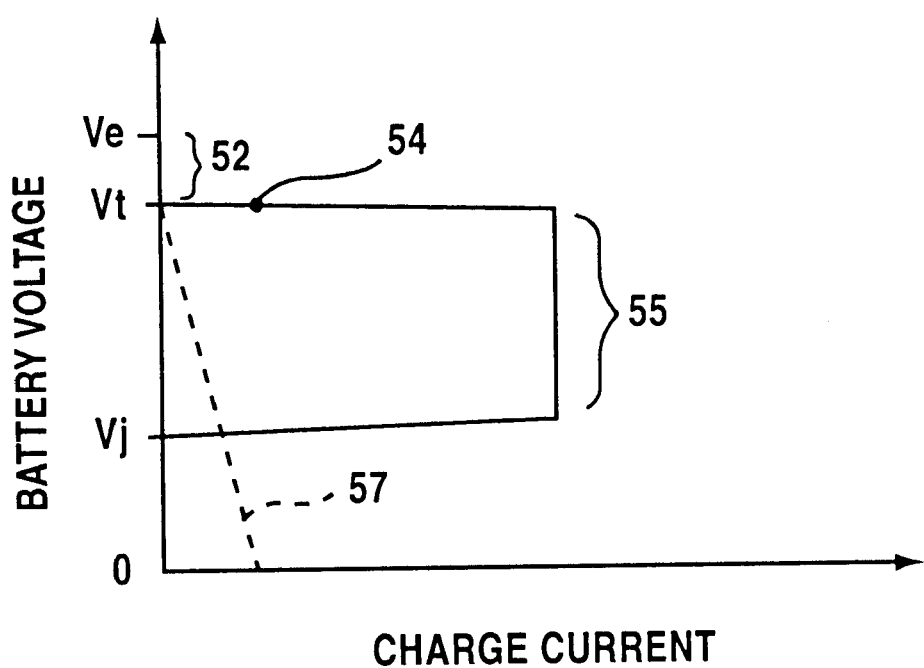
FIG. 5 is a diagram showing the output characteristic of the constant-voltage/constant-current circuit used in the battery charger of the invention.

The signal outputted from the power-supply-device detecting comparator 26 is fed also to a constant-voltage/constant-current circuit 29. When the battery pack 2 is not connected to the terminal (OUT), the constant-voltage/constant-current circuit 29 is turned off. By contrast, when the battery pack 2 is connected, the constant-voltage/constant-current circuit 29 is turned on, and exhibits an output characteristic as shown in FIG. 5. As shown in FIG. 5, the constant-voltage/constant-current circuit 29 is so configured that it does not perform charging when the voltage of the battery pack 2 is lower than a charge-inhibition level (Vj). The charge-inhibition level (Vj) is determined in accordance with the type of the battery used.

More specifically, owing to the above-mentioned output characteristic, in the voltage range 55 from around the charge-inhibition level (Vj) to around the voltage (Vt), constant-current charging is performed; as the voltage of the battery approaches the voltage (Vt) with the progress of the charging, the charging current is so reduced that the voltage is kept almost constant. Meanwhile, when the charge-completion point 54 is reached during the charging, the constant-voltage/constant-current circuit 29 (see FIG. 1) feeds a signal to the LED driving circuit 28 to request it to change the indication from "charge-in-progress" to "charge-complete". Thus, the LED driving circuit 28 turns off the charge-in-progress LED 4 and instead turns on the charge-complete LED 5 to indicate that the charging has been completed.

When the charging further progresses and the voltage of the battery reaches the voltage (Vt), the constant-voltage/constant-current circuit 29 is deactivated. Then, the pulse-drive starting comparator 14 activates the pulse current producing circuit 30 to start the supply of a periodic signal to the battery pack 2. The pulse current producing circuit 30 outputs the periodic signal in such a way that the battery pack 2 is charged gradually by the periodic signal. Accordingly, in the interval 52 shown in FIG. 5, the voltage of the battery gradually rises. When the voltage of the battery reaches the full-charge voltage (Ve), the pulse current producing circuit 30 (see FIG. 2) is deactivated, and thus the charging is completed.

In FIG. 5, the broken line 57 indicates the load characteristic of the feeble current I that is fed from the overdischarged battery recovering circuit 16. This line 57 shows that the overdischarged battery recovering circuit 16 supplies a current to the battery back 2 even in the interval 55, but that this current is far smaller than the charging current supplied from the constant-voltage/constant-current circuit 29. This line 57 also shows that, when the battery pack 2 is not connected to the terminal (OUT), the overdischarged battery recovering circuit 16 charges the output capacitor 3 in order to raise the voltage at the terminal (OUT) up to the voltage (Vt) and thereby activate the pulse current producing circuit 30.

As described above, the IC 1 can not only charge the battery pack 2, but also check whether the battery pack 2 is connected or not without using a mechanical switch and thereby turn on and off the LEDs 4 and 5 properly. Moreover, free from malfunction due to imperfect contact such as experienced with a mechanical switch, the battery charger of the embodiment provides higher safety. Furthermore, the elimination of the mechanical switch leads to the reduction of the cost of the battery charger.

Figure 6:
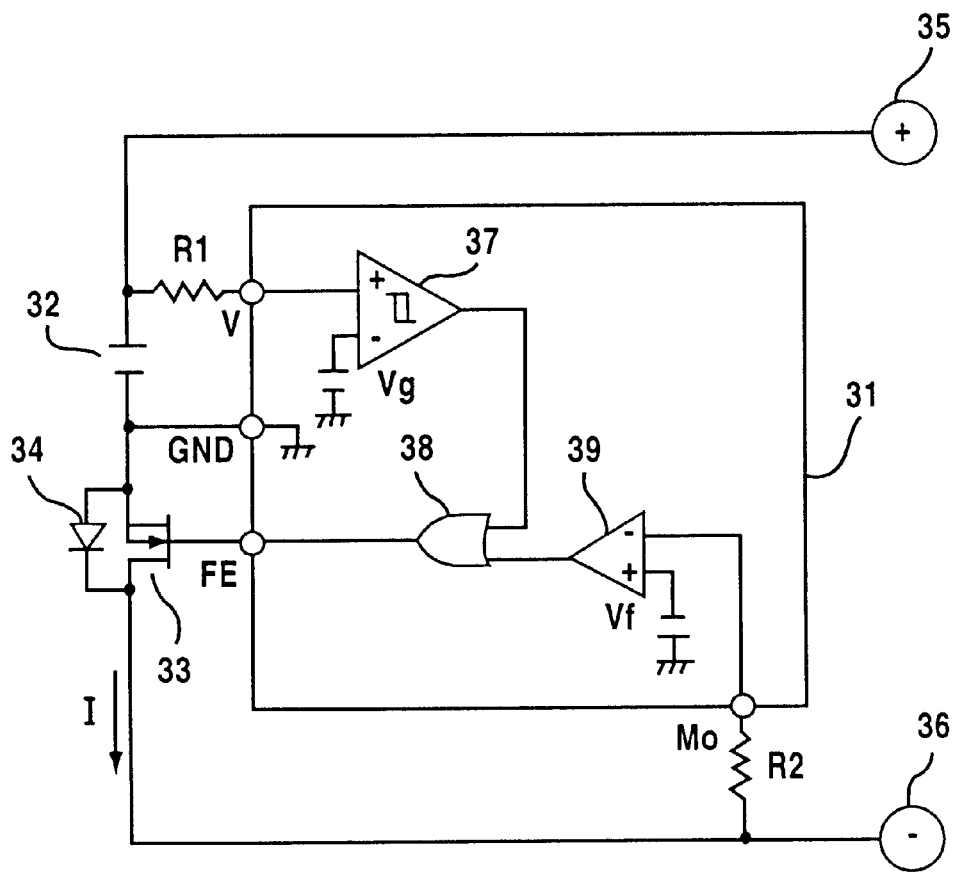
FIG. 6 is a circuit diagram of the charge control FET and the protection circuit incorporated in the power supply device.
Figure 7:
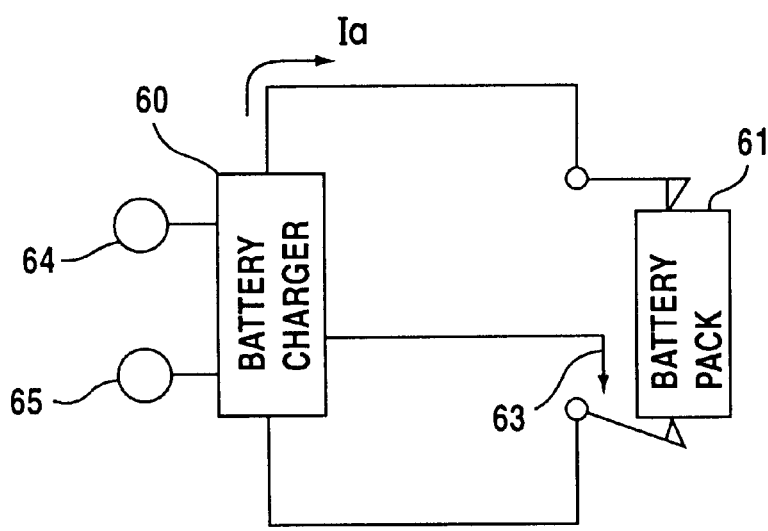
FIG. 7 is a block diagram showing how a conventional battery charger is connected to a battery pack.

Next, a description will be given as to the protection and other circuits incorporated into the battery pack 2. FIG. 6 shows an example of the internal circuit of the battery pack 2. The battery pack 2 essentially consists of a battery proper 32 such as a lithium-ion cell, a protection circuit 31, and an n-channel FET (field-effect transistor) 33 for discharge control. When the battery 32 is in the process of discharging, the FET 33 is normally kept on, and the discharged electricity is extracted via a positive (+) terminal 35 and a negative (−) terminal 36.

The voltage of the battery 32 is fed through a resistor R1 to a terminal (V) of the protection circuit 31. When the voltage of the battery 32 reaches the discharge-inhibition level (Vg) as the result of the discharging of the battery 32, a comparator 37 shifts its output from a high level to a low level. This level shift is fed through an OR gate 38 to a terminal (FE), and is outputted therefrom to turn off the FET 33. This inhibits the discharging of the battery 32 and thereby prevents the deterioration of the characteristics thereof.

However, in this state, in which the FET 33 is off, it is not possible to start the charging of the battery 32 immediately. First of all, it is necessary to apply a voltage close to the full-charge voltage of the battery 32 between the positive (+) and negative (−) terminals 35 and 36. This causes a feeble current I to flow through the body diode 34 of the FET 33, and thus causes a voltage drop there. This voltage drop is fed through a resistor R2 to a monitor terminal (MO) of the protection circuit 31, where a comparator 39 compares the drop with a voltage (Vf) and outputs, in this case, a high level. This high level is fed through the OR gate 38 to the terminal (FE), and is outputted therefrom to turn on the FET 33. Now it is possible to start the charging of the battery 32. Note that the body diode 34 is merely a parasitic diode, as explicitly illustrated, that exists in the FET 33. The protection circuit 31 also has a terminal (GND) through which it receives a reference level.

It is to be understood that the embodiment described specifically above is merely one example of how the present invention can be applied. For example, it is also possible to use, in place of the high-pass filter 1, any circuit that can detect alternating-current components in a signal; it is also possible to incorporate the oscillation capacitor 7 into the IC 1.

INDUSTRIAL APPLICABILITY

As described heretofore, according to the present invention, in a battery charger, a periodic signal is produced and fed to the output terminal so that, by checking whether the periodic signal is present at the output terminal or not, it is possible to check whether a battery pack is connected or not. This makes it possible to detect the presence of the battery pack without the use of a mechanical switch dedicated to such detection. The elimination of a mechanical switch leads not only to the elimination of malfunction due to imperfect contact or the like and thus to increased safety, but also to the reduction of the cost. In particular, in a battery charger for a battery pack, such as employs a lithium-ion cell, that is fitted with a protection circuit for protection against overdischarge and other hazards and that keeps its output voltage almost as high as the full-charge voltage even when no battery pack is connected to its output terminal, it is possible to detect the presence of the battery pack even when the battery charger is keeping its output at such a high voltage.

We claim:

1. A battery charger that outputs a predetermined voltage even when a power supply device having a rechargeable battery is not connected to said battery charger so that said battery charger can supply said predetermined voltage to said power supply device whenever said power supply device is connected to an output terminal of said battery charger, comprising:

periodic signal producing means for supplying a periodically varying periodic signal to said output terminal; and detecting means for checking whether said power supply device is connected to said battery charger or not by checking through a filter whether said periodic signal is present at said output terminal or not.

2. A battery charger as claimed in claim 1, further comprising:

charge completion indicating means; and indication disabling means for disabling said charge completion indicating means when said detecting means yields an output that indicates that said power supply device is not connected to said battery charger.

3. A battery charger as claimed in claim 1, wherein said battery is a lithium-ion cell.

4. A battery charger as claimed in any one of claims 1 to 3, wherein said periodic signal producing means produces said periodic signal when a voltage at said output terminal is in a predetermined range close to a voltage of said power supply device in its fully charged state.

5. A battery charger comprising:

an output terminal through which a current is supplied to a power supply device having a rechargeable battery;

periodic signal producing means for supplying a periodically varying periodic signal to said output terminal;

a first capacitor connected to said output terminal in such a way that said first capacitor is connected in parallel with said power supply device;

a detection comparator for checking whether said periodic signal is present at said output terminal;

a high-pass filter connected to an output side of said detection comparator;

a switching device that is turned on and off in accordance with an output of said high-pass filter;

a second capacitor that is charged and discharged according as said switching device is turned on and off; and power-supply-device detecting comparator for comparing a voltage across said second capacitor with a reference voltage.

6. A battery charger as claimed in claim 5, further comprising:

an overdischarged battery recovering circuit for keeping a voltage at said output terminal close to a voltage of said power supply device in its fully charged state when said power supply device is not connected to said output terminal.

* * * * *